US009979505B2

(12) United States Patent
Schroder et al.

(10) Patent No.: US 9,979,505 B2
(45) Date of Patent: May 22, 2018

(54) DELIVERY OF GPON TECHNOLOGY

(75) Inventors: Richard Schroder, Plano, TX (US);
Russell W. Brown, Euless, TX (US);
Thomas C. Ruvarac, Naperville, IL (US); John Silovich, Fox Lake, IL (US); Andrew G. Low, Grapevine, TX (US)

(73) Assignee: TELLABS ENTERPRISE, INC., Dallas, TX (US)

( * ) Notice: Subject to any disclaimer, the term of this patent is extended or adjusted under 35 U.S.C. 154(b) by 744 days.

(21) Appl. No.: 13/608,156

(22) Filed: Sep. 10, 2012

(65) Prior Publication Data

US 2014/0072264 A1 Mar. 13, 2014

(51) Int. Cl.
*G02B 6/36* (2006.01)
*H04J 14/00* (2006.01)

(52) U.S. Cl.
CPC .................... *H04J 14/00* (2013.01)

(58) Field of Classification Search
USPC ........................................................ 385/135
See application file for complete search history.

(56) References Cited

U.S. PATENT DOCUMENTS

| 5,349,457 | A | * | 9/1994 | Bears ................................ 398/58 |
| 5,654,592 | A | | 8/1997 | Butler et al. ....................... 307/80 |
| 6,362,908 | B1 | * | 3/2002 | Kimbrough et al. ......... 398/164 |
| 6,597,689 | B1 | * | 7/2003 | Chiu et al. ....................... 370/354 |
| 6,628,648 | B1 | * | 9/2003 | Francis ................. H04L 49/253 370/360 |
| 6,650,803 | B1 | * | 11/2003 | Ramaswami et al. .......... 385/17 |
| 6,667,973 | B1 | | 12/2003 | Gorshe et al. .................. 370/376 |
| 6,690,644 | B1 | | 2/2004 | Gorshe .......................... 370/219 |
| 6,744,887 | B1 | | 6/2004 | Berstein et al. ......... 379/406.08 |
| 6,768,745 | B1 | | 7/2004 | Gorshe et al. ................. 370/421 |
| 6,998,964 | B2 | | 2/2006 | Lomax, Jr. et al. ...... 340/310.07 |
| 7,197,010 | B1 | | 3/2007 | Berstein et al. .............. 370/252 |
| 7,450,581 | B2 | * | 11/2008 | Lee et al. ....................... 370/392 |
| 7,706,416 | B2 | * | 4/2010 | Kim et al. ..................... 370/535 |
| 8,175,463 | B2 | * | 5/2012 | Elberbaum ................... 398/141 |
| 8,434,115 | B1 | * | 4/2013 | Wynman ......................... 725/74 |
| 8,526,818 | B2 | * | 9/2013 | Kim et al. ....................... 398/67 |

(Continued)

FOREIGN PATENT DOCUMENTS

| CN | 201226577 | 4/2009 |
| CN | 101667866 | 3/2010 |
| CN | 102415021 | 4/2012 |

OTHER PUBLICATIONS

PCT International Search Report and Written Opinion of the International Searching Authority, dated Jun. 20, 2013 in PCT/CN2012/081247.

*Primary Examiner* — Kaveh C Kianni
(74) *Attorney, Agent, or Firm* — David G. Henry, Sr.

(57) ABSTRACT

A wall-mountable outlet comprising an enclosure and a faceplate mechanically coupled to the enclosure. An optical network terminal (ONT) is provided in the enclosure. In one example embodiment, the ONT comprises an optical-electrical (O-E) data module, and the O-E data module comprises an O-E converter. The O-E data module can further comprise a switch arranged to selectively couple at least one signal with the O-E converter. The O-E data module further can comprise a Passive Optical Network (PON) controller interposed between the O-E converter and the switch.

20 Claims, 13 Drawing Sheets

(56) References Cited

U.S. PATENT DOCUMENTS

| | | |
|---|---|---|
| 8,548,329 B2 | 10/2013 | Kim et al. ............... 398/68 |
| 8,818,192 B1 | 8/2014 | Smith et al. |
| 8,886,003 B2 * | 11/2014 | Nieves et al. ............. 385/135 |
| 2002/0081076 A1 | 6/2002 | Lampert et al. ............. 385/70 |
| 2004/0213286 A1 * | 10/2004 | Jette et al. ............. 370/466 |
| 2005/0069317 A1 * | 3/2005 | Lee et al. ............. 398/67 |
| 2005/0069318 A1 * | 3/2005 | Lee et al. ............. 398/67 |
| 2005/0152697 A1 * | 7/2005 | Lee et al. ............. 398/75 |
| 2007/0121624 A1 * | 5/2007 | Kimbrough et al. ......... 370/389 |
| 2008/0124083 A1 | 5/2008 | Esser et al. ............. 398/68 |
| 2008/0218947 A1 * | 9/2008 | Atkinson ............. 361/622 |
| 2008/0219633 A1 * | 9/2008 | Smith et al. ............. 385/135 |
| 2009/0060531 A1 | 3/2009 | Biegert et al. |
| 2009/0087181 A1 | 4/2009 | Gray |
| 2010/0008667 A1 | 2/2010 | Kim |
| 2010/0150556 A1 * | 6/2010 | Soto et al. ............. 398/66 |
| 2010/0226654 A1 * | 9/2010 | Smith et al. ............. 398/116 |
| 2010/0310255 A1 | 12/2010 | Trojer ............. 398/58 |
| 2011/0081144 A1 | 4/2011 | Zhao et al. ............. 398/20 |
| 2012/0045220 A1 * | 2/2012 | Veljkovic et al. ............. 398/186 |
| 2012/0144214 A1 | 6/2012 | Lee |
| 2012/0275784 A1 * | 11/2012 | Soto et al. ............. 398/38 |
| 2012/0292096 A1 * | 11/2012 | Wakileh et al. ............. 174/480 |
| 2013/0031379 A1 * | 1/2013 | Wacker ............. 713/300 |
| 2013/0058654 A1 | 3/2013 | Guo ............. 398/66 |
| 2013/0202247 A1 * | 8/2013 | Levy ............. H05K 1/147 385/14 |
| 2013/0272696 A1 * | 10/2013 | Palanisamy et al. ............. 398/25 |
| 2014/0075213 A1 | 3/2014 | He |

* cited by examiner

DELIVERY OF GPON TECHNOLOGY

BACKGROUND OF THE INVENTION

Field of the Invention

Example aspects described herein relate to gigabit passive optical network (GPON), power over Ethernet (PoE), and network power technologies, and, in particular, to delivery of GPON technology to office/warehouse spaces and the like utilizing wall box/cubical openings and the like to house network terminals.

Description of the Related Art

Optical network terminals (ONTs) utilizing GPON technology generally are packaged to fit in a rack, on a desk, or to be mounted on a wall utilizing adapters with optional battery backup for power. However, Active Ethernet (AE), which is a competing technology, utilizes wall boxes to house Ethernet jacks that deliver data and PoE. Utilizing a GPON fiber wire-based solution versus an AE copper wire-based application enables service providers to converge multiple end services (e.g., voice, data, and video) on a single fiber-based infrastructure with even higher rates than conventional AE solutions. Since efforts are being made to attempt displacing AE technology with GPON technology, adhering to conventional practices of utilizing wall boxes and not requiring adapters with battery backup mitigates limitations associated with learning, aesthetics, and cost barriers.

Conventional approaches in the industry to solve the foregoing involved attempting to deliver network power with a 48 volt rectifier and a current-limited DC-DC converter. Other approaches employ ONTs designed to mount to the outside of wall boxes. Still other approaches employ separate copper and fiber cables and/or desk mounted ONTs. Desk mounted ONTs may be vulnerable to being powered off by end users, and to being placed by end users in locations/environments that would violate the ONTs' thermal operating range.

SUMMARY

Various limitations associated with the foregoing can be overcome by a method, system, and apparatus according to example aspects described herein.

In one example embodiment herein, the apparatus comprises a wall-mountable outlet, comprising an enclosure and a faceplate mechanically coupled to the enclosure. An optical network terminal (ONT) is provided in the enclosure.

According to one example embodiment, the ONT comprises an optical-electrical (O-E) data module, and the O-E data module comprises an O-E converter.

The O-E data module can further comprise a switch arranged to selectively couple at least one signal with the O-E converter.

In some embodiments, the O-E data module further comprises a PON controller interposed between the O-E converter and the switch.

In still further embodiments, the ONT further comprises a connector coupled to the switch, and arranged to couple to a first information appliance.

According to another example, the O-E data module further comprises a transceiver interposed between the switch and the connector.

BRIEF DESCRIPTION OF THE DRAWINGS

The teachings claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

It should be noted that different ones of the Figures may include the same reference numerals to identify the same components, and thus a description of each such component may not be provided herein with respect to each particular Figure.

DETAILED DESCRIPTION

A description of example embodiments of the invention follows. In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits and devices are shown in block diagram form to avoid obscuring embodiments of the present invention unnecessarily.

Example aspects described herein relate to delivery of GPON technology, and, in particular, to delivery of GPON technology to office/warehouse spaces and the like utilizing wall box/cubical openings to house network powered ONTs with PoE utilizing a hybrid cable routed through the wall/cubical.

Figure 1:
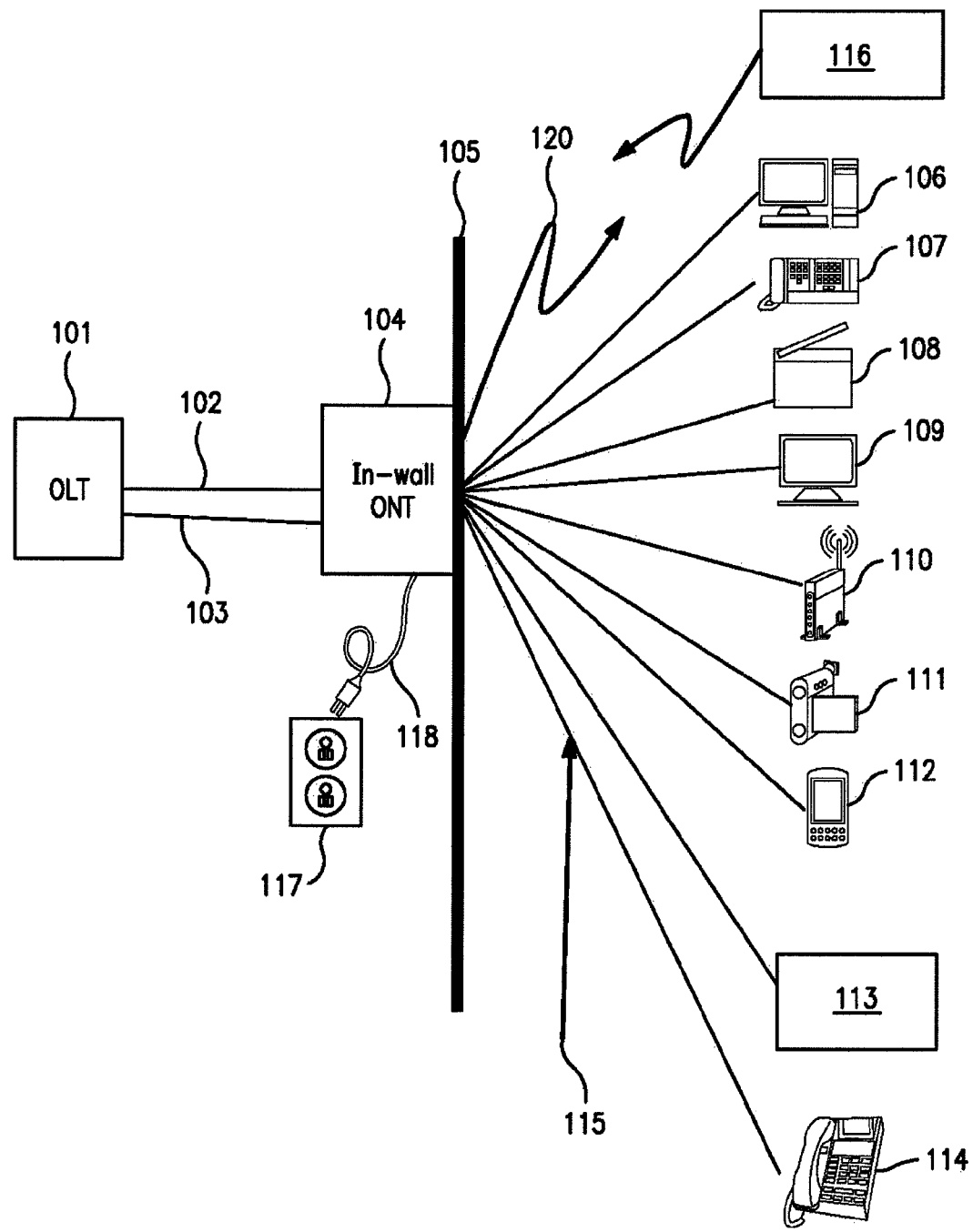
FIG. 1 illustrates an example in-wall ONT system that may be used in accordance with an example embodiment of the invention.

FIG. 1 is a block diagram of an example in-wall optical network terminal (ONT) system that may be used in accordance with an example embodiment of the invention. Illustrated in FIG. 1 is an optical line terminal (OLT) 101, which is connected to an in-wall ONT 104 via an optical fiber interface 102 and an ONT power cable interface 103. For example purposes, the interface 102 is described as being an optical fiber interface, although the interface 102 is not limited to being an optical fiber interface. In other example embodiments, the interface 102 can be, for example, an electrical conductor interface, a wireless interface, and/or any other type of interface.

According to one example embodiment, as will be described in further detail below in the context of FIG. 12, the in-wall ONT 104 can receive power signals from the OLT 101 via power cable interface 103, and/or from a local power source 117 (e.g., a power outlet) coupled to the in-wall ONT 104 via cable power interface 118.

The ONT 104 is mounted to or in a wall 105 and is connected to one or more components via one or more interfaces 115, such as, by example only, an IEEE category 5, category 5e, and/or category 6 cable, a fiber optic cable, and/or a wireless interface (e.g., a WIFI interface or a ZIGBEE interface) 120.

Example types of components that ONT 104 can be connected to include a computer 106, a voice-over-Internet-protocol (VOIP) telephone 107, a printer/facsimile/scanner 108, a video display 109, a wireless access point 110, a security camera 111, a security card reader 112, an analog telephone 114, a wireless communication device 116 (e.g., a WIFI device or a ZIGBEE device, such as a computer handheld device or other wireless user terminal), an external ONT (not shown in FIG. 1), and/or any other component(s) 113. In some example embodiments, a wireless antenna (not shown in FIG. 1) is mounted to a face of the ONT 104, to enable the ONT 104 to communicate with one or more wireless devices 116 via wireless interface 120. The components above are referred to herein as "information appliances". The foregoing examples of information appliances should not be construed as limiting.

Figure 2:
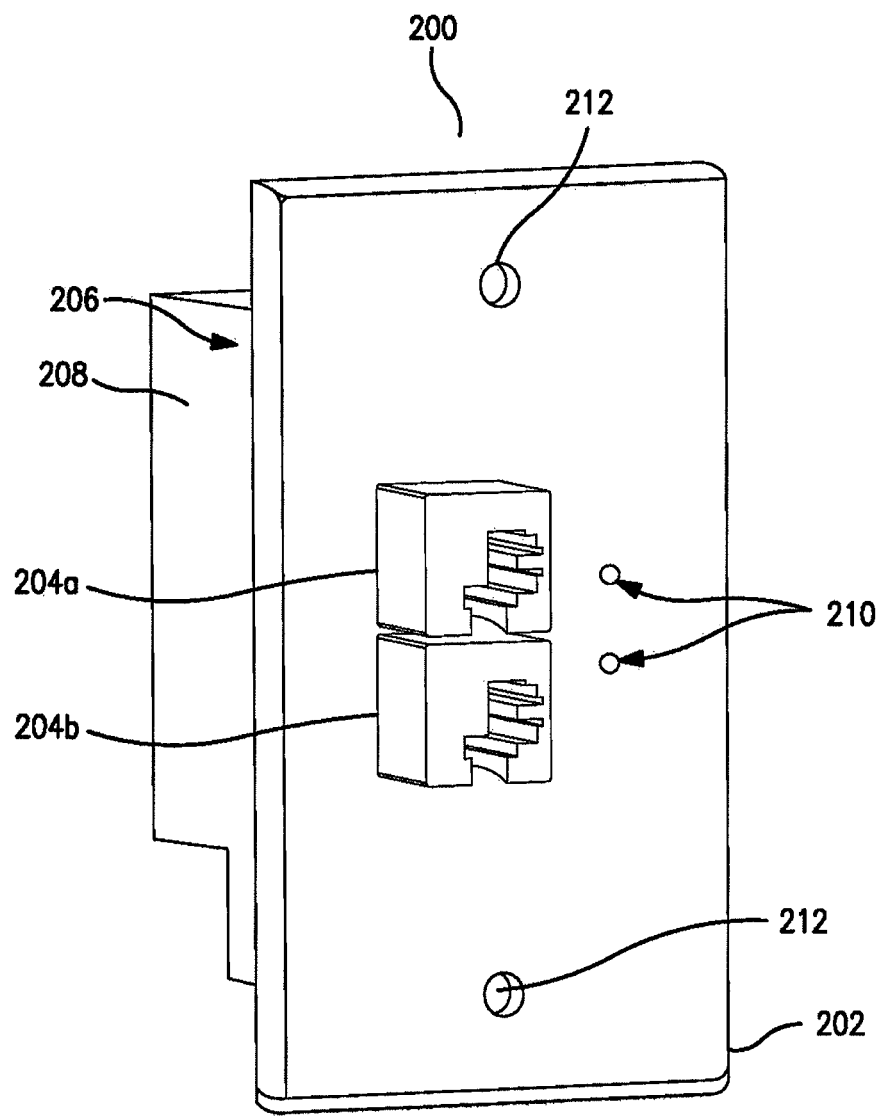
FIG. 2 illustrates a perspective view of an exemplary single-wide wall-mount ONT (as viewed looking towards a front and side thereof) that may be used in accordance with an example embodiment of the invention.
Figure 3:
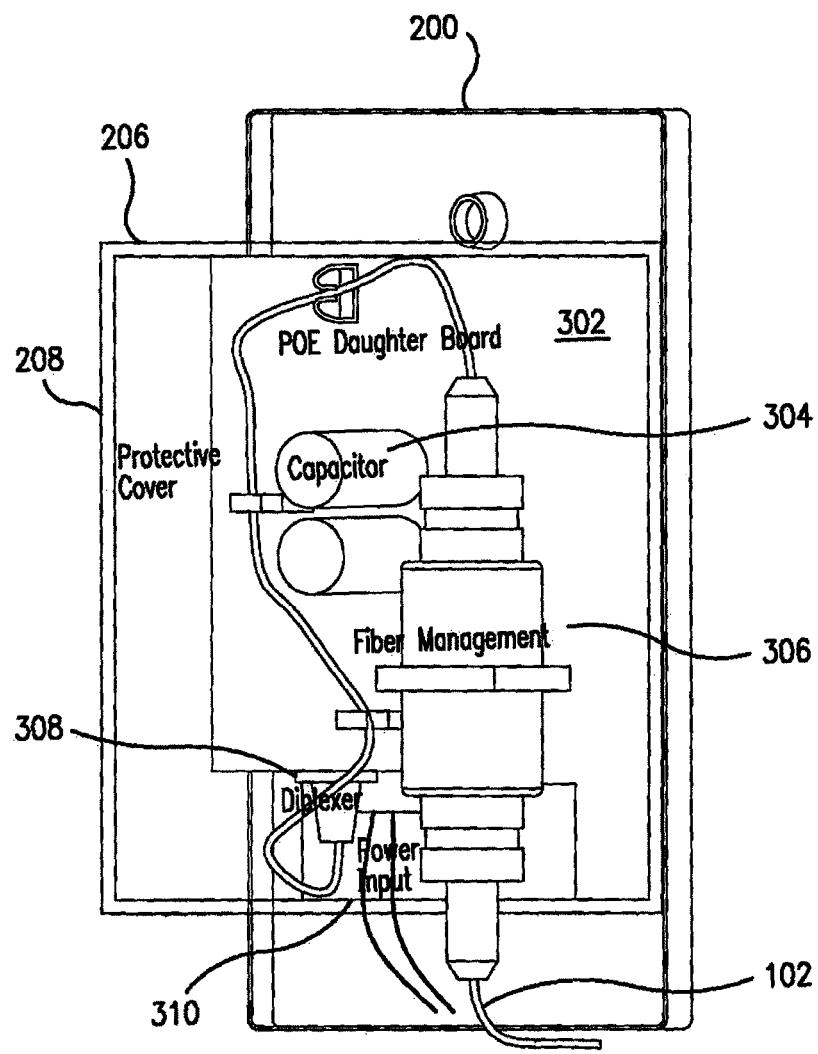
FIG. 3 illustrates a perspective view of an exemplary single-wide wall-mount ONT (as viewed looking towards a rear and side thereof) that may be used in accordance with an example embodiment of the invention.

Reference will now be made to FIGS. 2 and 3 for a mechanical diagram of an example single-wide in-wall ONT, such as the ONT 104 described in FIG. 1. Illustrated in FIG. 2 is a perspective view of an exemplary single-wide wall-mount ONT 200 (as viewed looking towards a front and side thereof). The ONT 200 includes a faceplate 202, a plurality of connectors (e.g., jacks such as Ethernet RJ-45) (in this example, connectors 204a and 204b) for receiving a cable (such as an Ethernet cable), and a rear wall box 206 having a protective cover 208. One or more mounting holes 212 can be included in the faceplate 202 for enabling the ONT 200 to be mounted to a wall or other structure. Also, one or more LED indicators 210 can be included to indicate, for example, the presence of power and/or a level of network activity. Although not shown in FIG. 2 for purposes of convenience, in one example one of the LED indicators 210 can be coupled to, and receive signals from, a power input of the ONT 200 by way of a noise decoupling circuit and a voltage converter, and another one of the LED indicators 210 can be coupled to, and receive data signals from, a PON controller, as will be described in further detail below in the context of FIGS. 9 and 10.

FIG. 3 is a perspective view of the exemplary single-wide wall-mount ONT 200 (as viewed looking towards a rear and side thereof) of FIG. 2. Depicted in FIG. 3 is a PoE daughter board 302, a capacitor 304, a fiber management module 306 (such as, for example, fiber management module 916 and/or the fiber management module 1022, which are described below in the context of FIGS. 9 and 10, respectively), an optical-electrical (O-E) converter 308 (e.g., a diplexer) (such as, for example, the O-E converter 906 and/or the O-E converter 1006, which are described below in the context of FIGS. 9 and 10, respectively), a power input 310, faceplate 202, and the rear wall box 206 having a protective cover 208.

Figure 4:
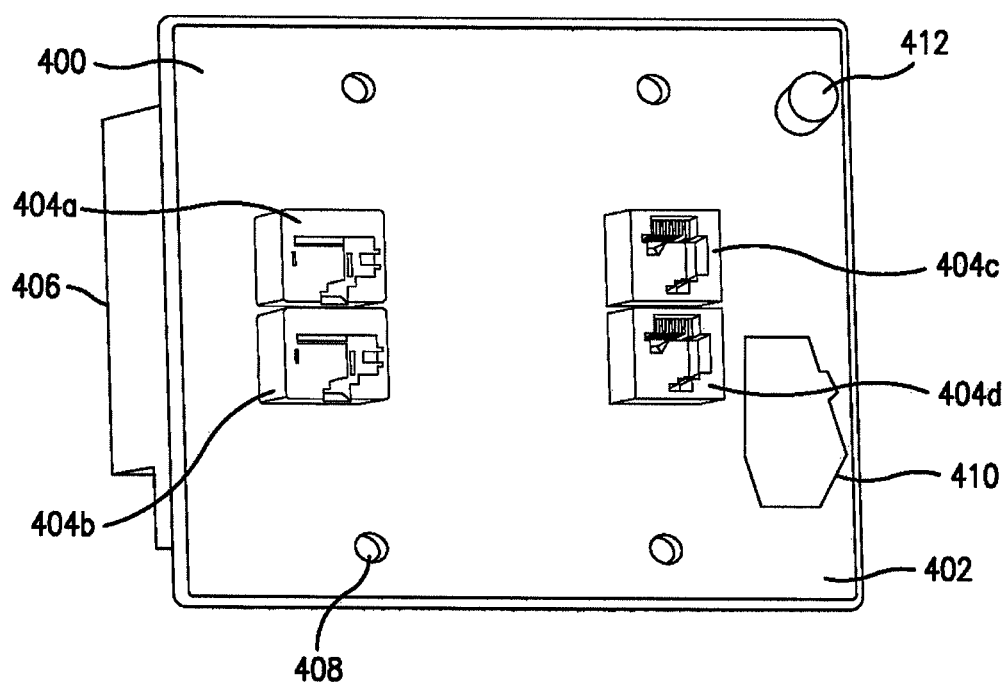
FIG. 4 illustrates a perspective view of an exemplary double-wide wall-mount ONT (as viewed looking towards a front and side thereof) that may be used in accordance with an example embodiment of the invention.

Having described an example single-wide in-wall ONT, reference will now be made to FIGS. 4 and 5 for a mechanical diagram of an example double-wide in-wall ONT, such as the ONT 104 described in FIG. 1. FIG. 4 is a perspective view of an exemplary double-wide wall-mount ONT 400 (as viewed looking towards a front and side thereof). The ONT 400 includes faceplate 402, a plurality of connectors (e.g., jacks such as Ethernet RJ-45) (in this example, Ethernet RJ-45 connector 404a, 404b, and plain old telephone system (POTS) RJ-11 404c, and 404d), and a rear wall box 406. One or more mounting holes 408 can be included in the faceplate 402 for enabling the ONT 400 to be mounted to a wall or other structure. Also, one or more other types of connectors can be provided, such as a single channel per carrier (SCPC) fiber connector 410, for enabling expansion to a desktop ONT. In another example embodiment, a female connector 412 (sometimes referred to as an F connector) is provided to enable the provision of services (e.g., cable television) over a coaxial cable.

Figure 5:
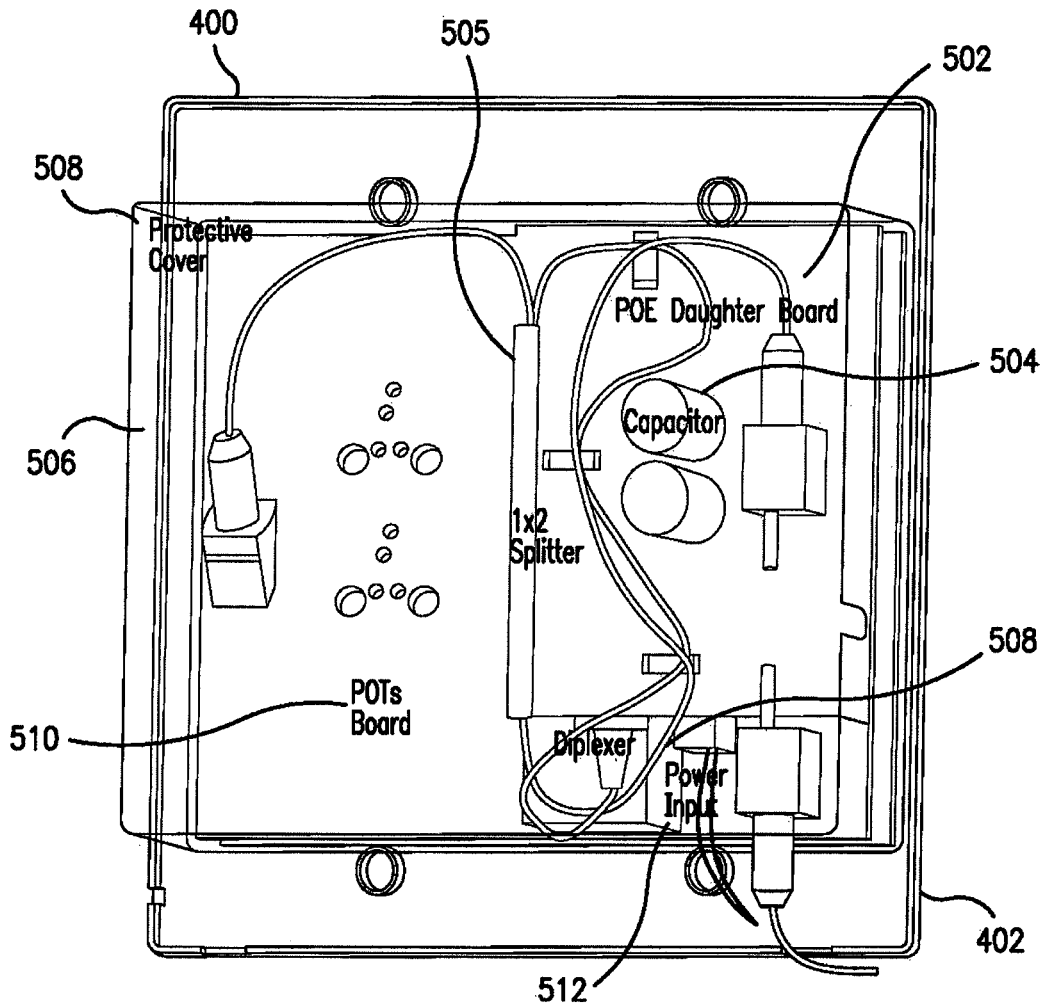
FIG. 5 illustrates a perspective view of an exemplary double-wide wall-mount ONT (as viewed looking towards a rear and side thereof) that may be used in accordance with an example embodiment of the invention.

FIG. 5 is a perspective view of the exemplary double-wide wall-mount ONT 400 (as viewed looking towards a rear and side thereof) of FIG. 4. Depicted in FIG. 5 is a PoE daughter board 502, at least one capacitor 504, a splitter 505 (e.g., a 1:2 splitter), a optical-electrical (O-E) converter 508 (e.g., a diplexer), a POTS board 510, a power input 512, and a rear wall box 506 having a protective cover 508. Although the splitter 505 is described herein as being a 1:2 splitter, this example is for convenience only, and should not be construed as limiting. In other example embodiments, splitter 505 can be a 1:n splitter, where n is any integer greater than 1.

In some example embodiments, the O-E converter 508 of the ONT of FIG. 5 may be a triplexer to enable the provision of a service (e.g., cable television) via a third wavelength.

In one example embodiment, as described in further detail below with reference to FIG. 11A, faceplate 402 dissipates heat from the various internal components of the ONT (e.g., PoE daughter board 502, POTS board 510, etc.) via a thermal interface material and a heatsink (e.g., thermal interface material 1102 and heatsink 1108 of FIG. 11A).

According to an example aspect herein, one or more of the example embodiments herein have the look and feel of Active Ethernet, enable simplified installation and turn-up, and integrate fiber and copper (or another suitable conductive material) into a single cable. Some example embodiments of ONT 104 also do not require power adapters if network power (e.g., PoE) is used, and do not require individual battery backup units if network power with remote battery backup is used (e.g., a battery backup included within ONT 104 or outside of ONT 104, such as provided by a remote OLT 101 described above in connection with FIG. 1). In one example embodiment, a remote battery backup unit (not shown in FIG. 1) located adjacent to or within OLT 101 (e.g., in OLT rack 656 and/or rack 700) provides power to ONT 104 via power cable interface 103. Also, in some example embodiments described herein, a separate fiber management tray is not required. Costs associated with POTS add-on modules can be deferred or avoided altogether.

In accordance with another example aspect herein, network power with PoE components may be used for cost savings. Individual circuits may limit power to a predetermined amount (e.g., 100 VA) for safety, and support protection all the way to the wall plate. With Active Ethernet, on the other hand, the copper loop from the Active Ethernet electronics to the end user is unprotected, and, in at least some cases, this unprotected portion can extend for 100 meters in length. Utilizing an ONT with a GPON protection module supports protection all the way to a user's cubicle/wall plate, for example.

In some example embodiments, an optional 1:2 splitter module (see, e.g., FIG. 5, 505, FIG. 6, 626, FIG. 8, 804, FIG. 10, 1010) is integrated into an ONT to enable switch protection and desktop ONT add-ons, although, in other embodiments, other types of splitters, couplers, and/or switches can be used, for example, to provide any x:y functionality.

Having described example in-wall ONTs, an example GPON apparatus which may be used in conjunction with in-wall ONTs (such as the ONTs 104, 200, and 400 described above in connection with FIGS. 1 through 5) will now be described with reference to FIGS. 6 and 7.

Figure 6:
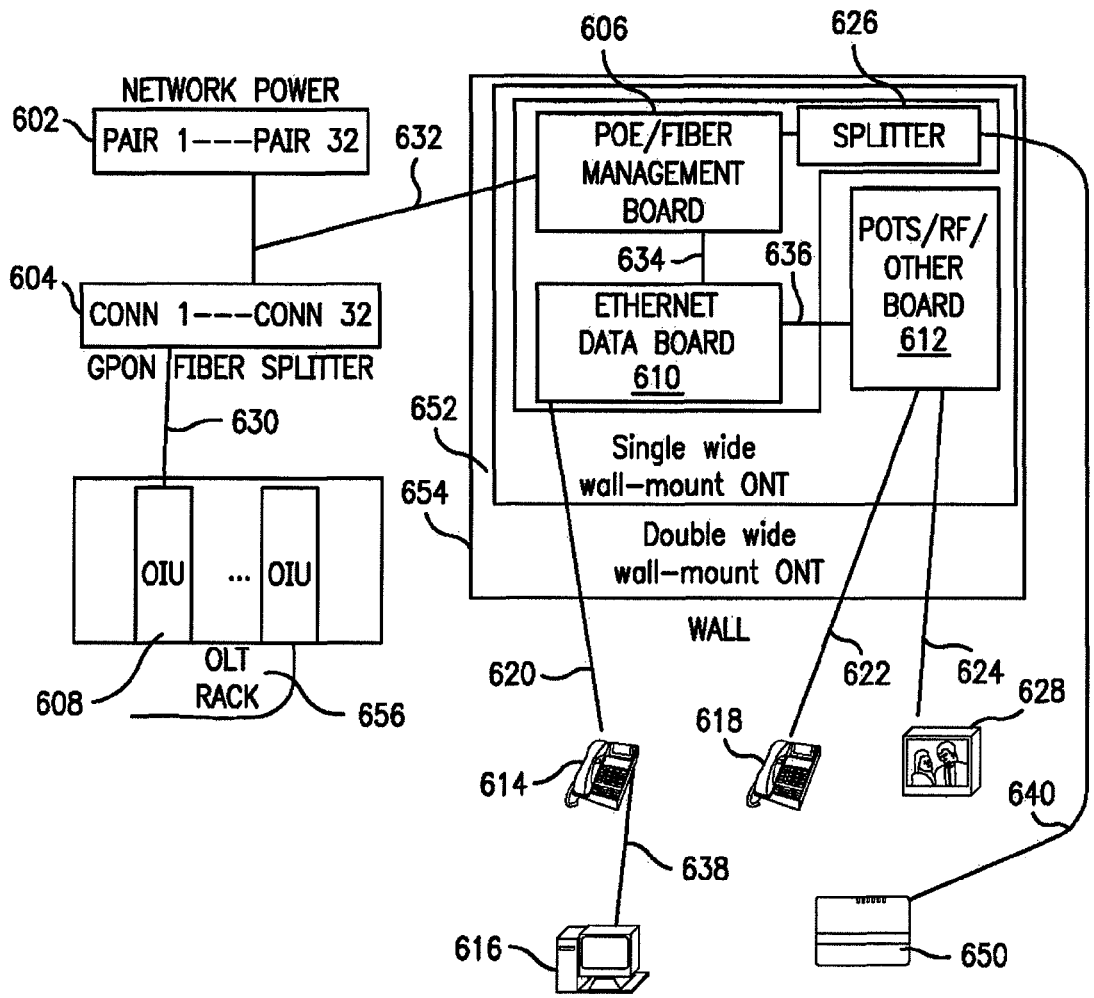
FIG. 6 illustrates the interconnections of various components of an exemplary GPON system that may be used in accordance with an example embodiment of the invention.

FIG. 6 is a diagram illustrating the interconnections of various components of an exemplary GPON apparatus. Included in FIG. 6 is an in-wall ONT, which can be a single-wide in-wall ONT 652 or a double-wide in-wall ONT 654. In some example embodiments, the single-wide in-wall ONT 652 corresponds to the single-wide in-wall ONT 200 described above in connection with FIG. 2. In other example embodiments, the double-wide in-wall ONT 654 corresponds to the double-wide in-wall ONT 400 described above in connection with FIGS. 4 and 5. Also, network power module 602 (e.g., 32 pairs of fibers) is connected to at least one splitter 604 (e.g., 1:32 GPON fiber splitter) and to a PoE/fiber management board 606 via interface 632 (e.g., a wire sheath that includes a bidirectional optical data input/output line that carries gigabit Ethernet signals and one or more copper wires that carry electrical power). Outputs from the splitter 604 are connected to one or more optical interface units (OIUs) 608 (which, in one example embodiment may be included within OLT rack 656) via interface 630 (e.g., a gigabit Ethernet cable).

The PoE/fiber management board 606 is connected to a splitter 626. One bidirectional input/output of the splitter 626 is connected to one or more other types of connectors (e.g., a SCPC fiber connector, such as connector 410 of FIG. 4) to enable expansion to a desktop ONT. In one example embodiment, one bidirectional input/output of the splitter 626 is connected to a modem 650 via interface 640 (e.g., a gigabit Ethernet interface).

A second bidirectional input/output of the splitter 626 is connected to the Ethernet data board 610 via interface 634 (e.g., a serializer/deserializer (SERDES) interface or a media independent interface (MII)). The Ethernet data board 610 also is connected to one or more expansion boards 612 (such as, by example only, a POTS board, an RF video board, an RF-over-glass (RFOG) board, a wireless board, a WIFI board, a ZIGBEE board, and/or the like, each of which is described in further detail below in the context of FIG. 10) via interface 636 (e.g., a SERDES interface or an MII). The Ethernet data board 610 also is connected to one or more information appliances, such as user communication terminals 614 (e.g., a telephone 614 connected to a computer 616 by way of interface 638 (e.g., a gigabit Ethernet interface)), by way of interface 620 (e.g., a gigabit Ethernet and power-over-Ethernet (PoE)). The one or more expansion boards 612 also are connected to one or more information appliances, such as user communication terminals (e.g., a telephone 618 and a video device 628) by way of one or more interfaces, such as a POTS interface 622 and a RF video interface 624, respectively.

Example types of interfaces 630, 632, 634, 636, 620, 622, 638, 624, and 640 are provided herein for convenience only, and should not be construed as limiting. In some embodiments, any one or more other types of interfaces (e.g., a gigabit Ethernet interface, a SERDES interface, an MII, a PoE interface, a POTS interface, an RF video interface, an optical interface, a wireless interface (e.g., an antenna), a WIFI interface, a ZIGBEE interface, an RFOG interface, and/or the like) can be used for any one or more of the interfaces 630, 632, 634, 636, 620, 622, 638, 624, and 640.

Figure 7:
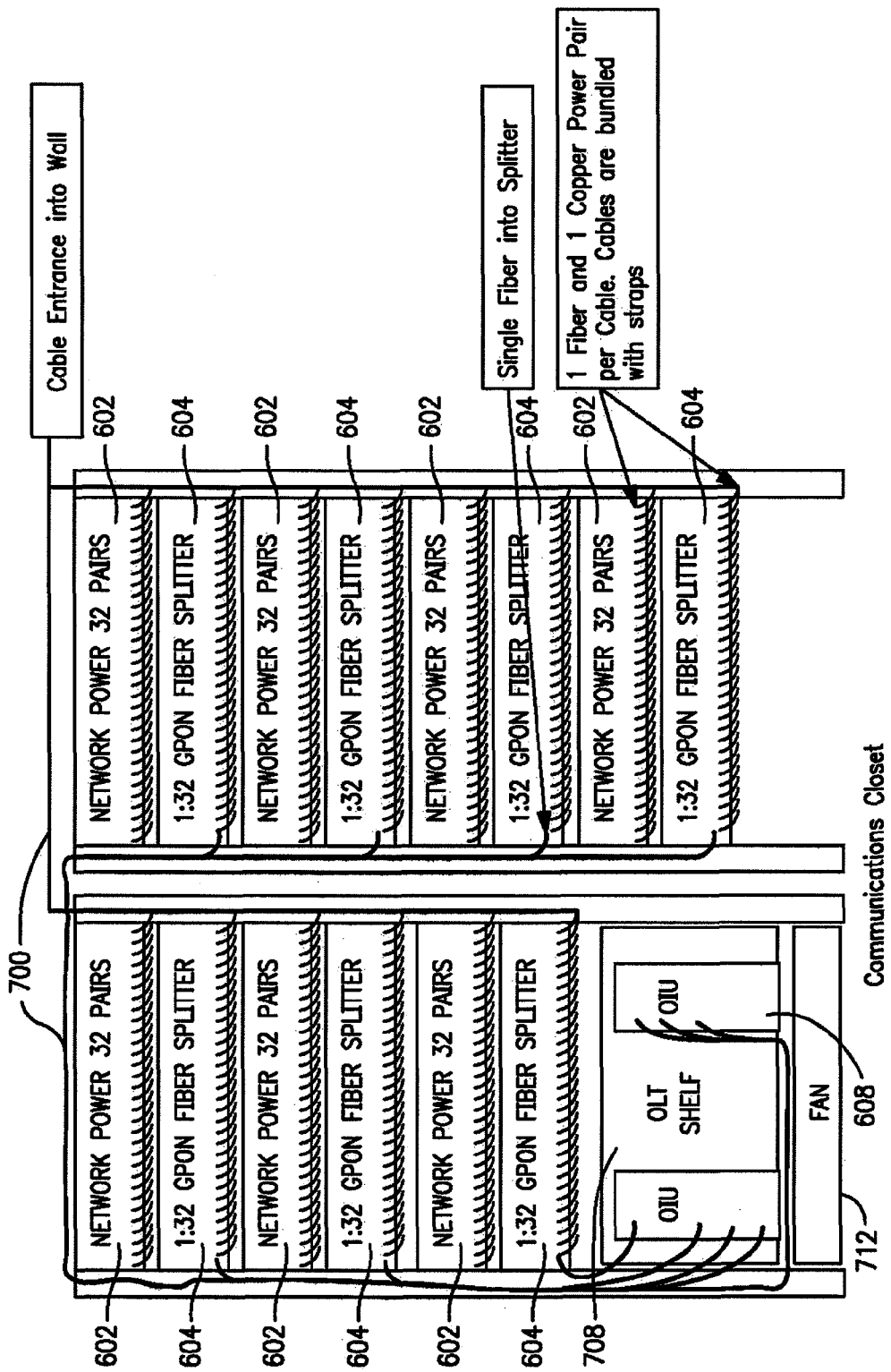
FIG. 7 illustrates a portion of an exemplary GPON apparatus that may be used in accordance with an example embodiment of the invention.

FIG. 7 illustrates a portion of an exemplary GPON apparatus including a plurality of racks 700 in which various modules are housed. In one example embodiment, the racks 700 shown in FIG. 7 may further represent the OLT rack 656 of FIG. 6 (described above). In the illustrated embodiment, there are network power modules 602 (e.g., network power with 32 pairs), and splitters (e.g., 1:32 GPON fiber splitters) 604, an optical line terminal (OLT) shelf 708, one or more optical interface units (OIUs) 608, and a fan 712. In one example embodiment, each splitter 604 has a single fiber provided thereto, which splits signals received over the fiber into 32 signals that are provided over respective cables. In one example aspect, each such cable comprises a fiber and copper power pair, and the cables are bundled with straps.

Figure 8:
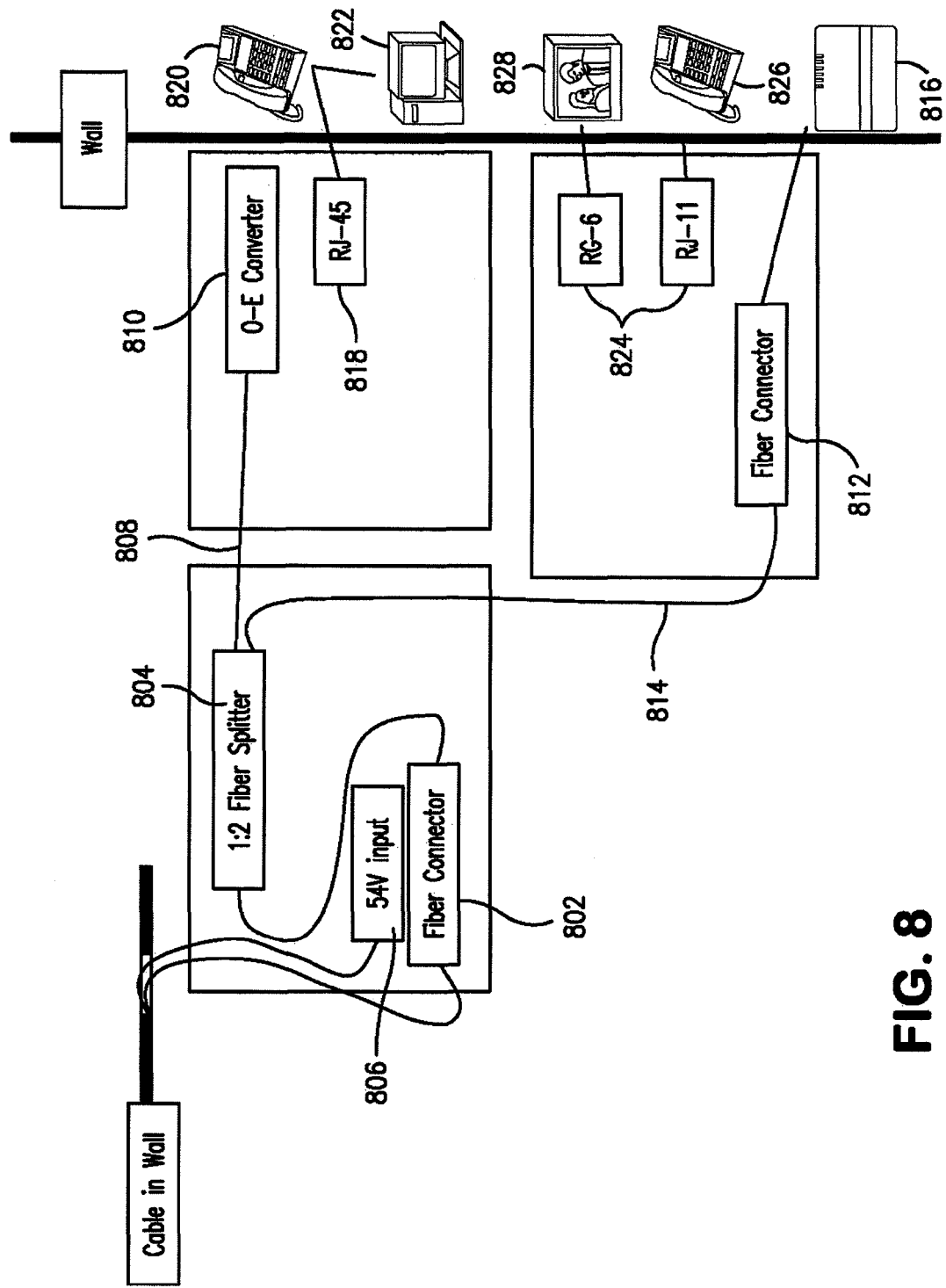
FIG. 8 illustrates a portion of an exemplary GPON apparatus that may be used in accordance with an example embodiment of the invention.

FIG. 8 shows some internal connections in an in-wall ONT in the context of an exemplary GPON apparatus, in accordance with some example embodiments. As shown in FIG. 8, a cable is connected to a power input (e.g., 54 volts) 806, and a cable is connected to a fiber connector 802, which is connected at another end thereof to a splitter 804 (e.g., 1×2 fiber splitter), which, in turn, is connected via a cable 808 to an optical-electrical converter 810 (e.g., a diplexer/triplexer) and which also is connected to a fiber connector 812 by way of cable 814. In one example embodiment, the voltage level of the power input 806 is 54 volts; however, this example should not be construed as limiting. That is, the voltage level of the power input 806 may be any other predetermined voltage level (e.g., a voltage level suitable for powering one or more particular devices to be powered). The connector 812 is connected at another end thereof to an external device, such as a desk mounted ONT 816. Connector (e.g., RJ-45) 818 connects to one or more external communication terminals (sometimes also referred to as information appliances), such as, e.g., a telephone 820 and/or computer system 822, and connectors 824 (e.g., RG-6 and RJ-11) connect to one or more user communication terminals such as a video device 828 and a telephone 826.

One or more of the example embodiments described herein also support a form factor to match commercially available faceplates for common look and feel. The ONT modular design allows for "ganging of modules", which provides for (1) the use of standard faceplate sizes, (2) the addition of voice, 2:1 splitter (for connection to desktop ONTs), and GPON protection, and (3) easy upgrades for when the needs of end users change.

Figure 9:
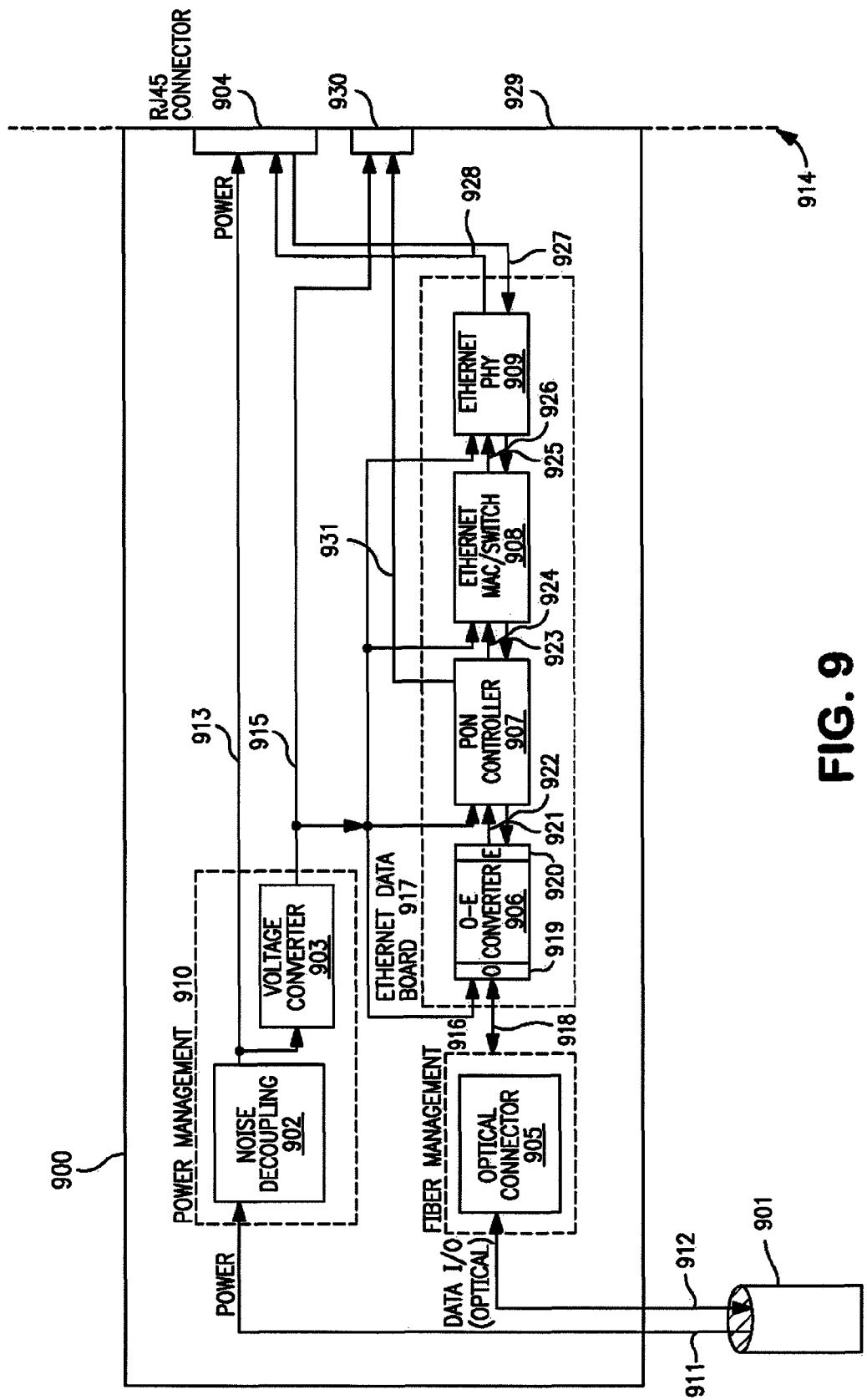
FIG. 9 illustrates an electrical diagram of an exemplary single-wide wall-mount ONT that may be used in accordance with an example embodiment of the invention.

FIG. 9 illustrates an electrical diagram of an exemplary single-wide wall-mount ONT 900 (such as, for example, the single-wide wall-mount ONT 200 shown in FIGS. 2 and 3) that may be used in accordance with an embodiment of the invention. As shown in FIG. 9, the ONT 900 is fed power and data via a wire sheath 901 that includes one or more copper wires 911 that carry electrical power and a bidirectional optical data input/output line 912, respectively. In one example embodiment, the electrical power is sourced by one or more PoE power sources such as the network power modules 602 illustrated in FIGS. 6 and/or 7, and the data line 912 is communicatively coupled to an optical line terminal (OLT) (not shown in FIG. 9). As discussed in further detail below with reference to FIG. 9, the ONT 900 can be communicatively coupled to one or more external components (e.g., an OLT, a computer, a telephone, a television, etc.), and signals can be communicated between the one or more external components by way of the ONT 900.

The ONT 900 includes a power management module 910 that receives the power input by the one or more copper wires 911. The power management module 910 includes a noise decoupling circuit 902 to decouple from the power line any noise that may have been coupled onto the power line from, e.g., electrical wiring or components positioned nearby the wire sheath 901. The noise decoupling circuit 902 may include, for example, one or more shunted capacitors, such as capacitors 304 and 504 illustrated in FIGS. 3 and 5, respectively.

Power is delivered by the noise decoupling circuit 902 to an RJ-45 connector 904 via an electrical conductor 913, such as, by example only, a wire or a plane (not shown in FIG. 9) of a printed circuit board (PCB) (not shown in FIG. 9). According to one example, power is delivered to particular pins of the RJ-45 connector 904 in accordance with a power over Ethernet (PoE) standard. The RJ-45 connector 904 is accessible through the wall 914 via a faceplate 929 of the wall-mount ONT 900, in one example embodiment.

The power management module 910 also includes, in one example embodiment, a voltage converter 903 that converts the voltage supplied by the one or more copper wires 911 to a voltage suitable for one or more other components (e.g., an optical-electrical (O-E) converter 906, a Passive Optical Network (PON) controller 907, a switch 908 (e.g., an Ethernet media access controller (MAC)/switch), and/or a transceiver 909 (e.g., an Ethernet physical layer transceiver, sometimes also referred to as a PHY device)) of the ONT 900. The voltage converter 903 then outputs the converted voltage to one or more other components of ONT 900 via an electrical conductor 915, such as, by example only, a wire or a power plane of a PCB (not shown in FIG. 9).

It should be noted that although FIG. 9 shows the voltage converter 903 outputting one voltage, the voltage converter 903 may output multiple different voltages to accommodate the voltage requirements of different devices included within the ONT 900. Alternatively, the power management module 910 may include multiple voltage converters 903, with each voltage converter providing a different voltage.

As mentioned above, an optical data line 912 included within the wire sheath 901 is connected to the ONT 900. Although in the following example the optical data line 912 is described as being a single bidirectional input/output data line, this is for convenience only. In other example embodiments, the optical data line 912 may include one or more unidirectional input data lines, unidirectional output data lines, and/or bidirectional input/output data lines.

In the illustrated example, the fiber management module 916 includes an optical connector 905 to which the optical data line 912 is connected in order to mitigate potential bending hazards or other physical damage. The optical connector 905, in turn, is connected to an optical-electrical (O-E) data module 917 (e.g., an Ethernet data board) via a bidirectional optical data line 918. The optical data line 918 can be a single bidirectional input/output data line, or in other example embodiments, one or more unidirectional input data lines, one or more unidirectional output data lines, and/or one or more bidirectional input/output data lines.

In the illustrated embodiment, the O-E data module 917 includes an optical-electrical (O-E) converter 906 (e.g., a diplexer), a Passive Optical Network (PON) controller 907, a switch 908 (e.g., an Ethernet media access controller (MAC)/switch), and a transceiver 909 (e.g., an Ethernet physical layer transceiver, sometimes also referred to as a PHY device).

The O-E converter 906 converts data from the optical domain at an optical terminal 919 to the electrical domain to output an electrical signal at one or more electrical terminals 920, and vice versa. In one example embodiment, the O-E converter 906 employs frequency domain multiplexing to enable bidirectional (upstream/downstream) optical communication using a single optical data line.

The O-E converter 906 is connected to a PON controller 907 via an upstream data line 921 and a downstream data line 922. In particular, the electrical input of the O-E converter 906 is connected to an output of the PON controller 907 via the upstream data line 921, and the electrical output of the O-E converter 906 is connected to an input of the PON controller 907 via the downstream data line 922.

The PON controller 907 performs various functions enabling the ONT 900 to interface between Ethernet devices and optical networks. The PON controller 907, for example, performs multiplexing and demultiplexing of data and encoding and decoding of data between formats suitable for optical transmission and suitable for Ethernet devices.

The PON controller 907 enables one or more external devices (such as, e.g., information appliances which may be Ethernet devices in one example (not shown in FIG. 9)) connected to the ONT 900 via RJ-45 connector 904 to share a single PON (e.g., a GPON, not shown in FIG. 9) by controlling the timing and flow of signals between the external devices. For example, although not shown in FIG. 9 for convenience, one or more sets of transceiver 909 and RJ-45 connector 904, and/or one or more additional connectors and accompanying controllers or the like, can be included in ONT 900, and can be coupled to switch 908 to enable one or more external information appliances to be coupled to O-E converter 906 by way of PON controller 907, and thus to an external PON by way of wire sheath 901, optical data input/output line 912, and optical connector 905.

The PON controller 907 also can be connected to one or more LED indicators 930 via at least one electrical data line 931, and the one or more LED indicators 930 also can be connected to the voltage converter 903 by way of electrical conductor 915. According to one example, in response to receiving one or more converted voltage signals from the voltage converter 903, at least one of the one or more LED indicators 930 is illuminated to indicate the presence of power within the ONT 900 (e.g., on electrical conductor 915). In another example, when the PON controller 907 detects network activity (e.g., the transmission of one or more data signals from and/or to the O-E converter 906 and/or the Ethernet MAC switch 908), the PON controller 907 provides a signal having a first predetermined logic level to the one or more LED indicators 930 via electrical data line 931 that causes at least one of the one or more LED indicators 930 to become illuminated, and when the PON controller 907 detects no network activity (e.g., the lack of transmission of any data signal from and/or to the O-E converter 906 and/or the Ethernet MAC switch 908), the PON controller 907 does not enable illumination of the one or more LED indicators 930. The one or more LED indicators 930 are visible through the wall 914 via a faceplate 929 of the wall-mount ONT 900, according to one example embodiment.

The PON controller 907 is connected to a switch 908 (e.g., an Ethernet MAC/switch) via an upstream data line 923 and a downstream data line 924. In particular, the electrical input of the PON controller 907 is connected to an output of the Ethernet MAC/switch 908 via the upstream data line 923, and the electrical output of the PON controller 907 is connected to an input of the Ethernet MAC/switch 908 via the downstream data line 924.

The Ethernet MAC/switch 908 provides addressing and channel access control mechanisms that enable multiple Ethernet devices to access a shared medium (e.g., data lines 923 and 924) in a multi-point network, via the wall-mount ONT 900, in the illustrated example. In one example embodiment, the Ethernet MAC/switch 908 enables multiple Ethernet devices (e.g., computers, telephones, IP telephones, etc.) to access a GPON (not shown in FIG. 9) via the wall-mount ONT 900. For example, although not shown in FIG. 9 for convenience, one or more sets of transceiver 909 and RJ-45 connector 904, and/or one or more additional connectors and accompanying controllers or the like, can be included in ONT 900, and can be coupled to switch 908 to enable one or more external information appliances to be coupled to PON controller 907.

The Ethernet MAC/switch 908 is connected to a transceiver 909 (e.g., an Ethernet physical layer transceiver, sometimes also referred to as a PHY device) via an upstream data line 925 and a downstream data line 926. In particular, the electrical input of the Ethernet MAC/switch 908 is connected to an output of the transceiver 909 via the upstream data line 925, and the electrical output of the Ethernet MAC/switch 908 is connected to an input of the transceiver 909 via the downstream data line 926. The transceiver 909 provides physical signal access to the link and implements the hardware send and receive functions of Ethernet frames.

The transceiver 909 is connected to the RJ-45 connector 904 via an upstream data line 927 and a downstream data line 928. In particular, the electrical input of the transceiver 909 is connected to an output of the RJ-45 connector 904 via the upstream data line 927, and the electrical output of the transceiver 909 is connected to an input of the RJ-45 connector 904 via the downstream data line 928. One or more external Ethernet devices (not shown in FIG. 9) can be connected to the RJ-45 connector 904 via an Ethernet cable (not shown in FIG. 9) to provide the one or more Ethernet devices with power and/or data connectivity to a multi-point network (not shown in FIG. 9), such as a GPON.

In the example illustrated in FIG. 9, the Ethernet MAC/switch 908 and the transceiver 909 are communicatively coupled to a single Ethernet (RJ-45) connector 904, although, in other example embodiments one or more Ethernet MAC/switches 908 and one or more transceivers 909 can be communicatively coupled to multiple Ethernet (RJ-45) connectors, one for each of multiple corresponding external devices (such as information appliances, not shown in FIG. 9). In the case where one or more Ethernet MAC/switches 908 and one or more transceivers 909 are communicatively coupled to multiple Ethernet (RJ-45) connectors, one for each of multiple corresponding external devices, the one or more Ethernet MAC/switches 908 enable the multiple external devices to share the single ONT 900 by controlling the timing and flow of signals between the multiple external devices.

Figure 10:
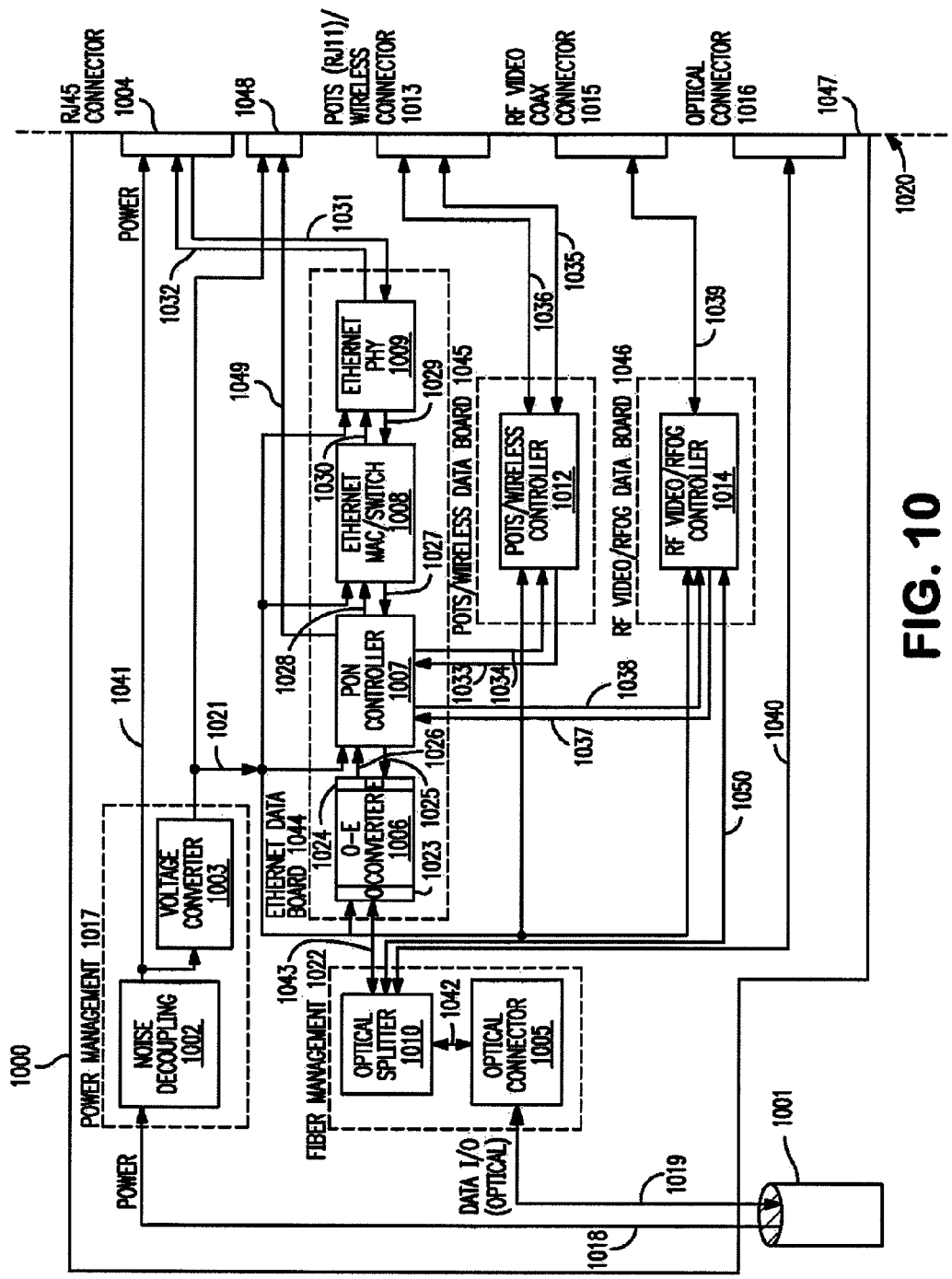
FIG. 10 illustrates an electrical diagram of an exemplary double-wide wall-mount ONT that may be used in accordance with an example embodiment of the invention.

FIG. 10 illustrates an electrical diagram of an exemplary double-wide wall-mount ONT 1000 (such as, for example the double-wide wall-mount ONT 400 shown in FIGS. 4 and 5) that may be used in accordance with an embodiment of the invention. As shown in FIG. 10, the ONT 1000 is fed power and data via a wire sheath 1001 that includes one or more copper wires 1018 that carry electrical power and a bidirectional optical data input/output line 1019, respectively. In one example embodiment, the electrical power is sourced by one or more PoE power sources such as the network power modules 602 illustrated in FIGS. 6 and/or 7, and the data line 1019 is communicatively coupled to an optical line terminal (OLT) (not shown in FIG. 10). As discussed in further detail below with reference to FIG. 10, the ONT 1000 can be communicatively coupled to one or more external components (e.g., an OLT, a computer, a telephone, a television, etc.), and signals can be communicated between the one or more external components by way of the ONT 1000.

The ONT 1000 includes a power management module 1017 that receives the power input by the one or more copper wires 1018. The power management module 1017 includes a noise decoupling circuit 1002 to decouple from the power line any noise that may have been coupled onto the power line from, e.g., electrical wiring or components positioned nearby the wire sheath 1001. The noise decoupling circuit 1002 may include, for example, one or more shunted capacitors, such as capacitors 304 and 504 illustrated in FIGS. 3 and 5, respectively.

Power is delivered by the noise decoupling circuit 1002 to an RJ-45 connector 1004 via an electrical conductor, such as, by example only, a wire or a plane (not shown in FIG. 10) of a PCB (not shown in FIG. 10). According to one example, power is delivered to particular pins of the RJ-45 connector 1004 in accordance with a power over Ethernet (PoE) standard. The RJ-45 connector 1004 is accessible through the wall 1020 via a faceplate 1047 of the wall-mount ONT 1000, in one example embodiment.

The power management module 1017 also includes, in one example embodiment, a voltage converter 1003 that converts the voltage supplied by the one or more copper wires 1018 (and provided through circuit 1002) to a voltage suitable for powering one or more other components (e.g., an optical-electrical (O-E) converter 1006, a Passive Optical Network (PON) controller 1007, a switch 1008 (e.g., an Ethernet media access controller (MAC)/switch), and an Ethernet PHY device 1009, a first controller 1012 (e.g., a POTS controller, a wireless controller, a WIFI controller, and/or a ZIGBEE controller), and/or a second controller 1014 (e.g., an RF video and/or an RF-over-glass (RFOG) controller) of the ONT 1000. The voltage converter 1003 then outputs the converted voltage to one or more other components of ONT 1000 via an electrical conductor 1021, such as, by example only, a wire or a power plane of a PCB (not shown in FIG. 10).

It should be noted that although FIG. 10 shows the voltage converter 1003 outputting one voltage, the voltage converter 1003 may output multiple different voltages to accommodate the voltage requirements of different devices included within the ONT 1000. Alternatively, the power management module 1017 may include multiple voltage converters 1003, with each voltage converter providing a different voltage.

As mentioned above, an optical data line 1019 included within the wire sheath 1001 is connected to the ONT 1000. Although in the following example the optical data line 1019 is described as being a single bidirectional input/output data line, this is for convenience only. In other example embodiments, the optical data line 1019 may include one or more unidirectional input data lines, one or more unidirectional output data lines, and/or one or more bidirectional input/output data lines.

In the illustrated example, the fiber management module 1022 includes an optical connector 1005 to which the optical data line 1019 is connected in order to mitigate potential bending hazards. The fiber management module 1022 also includes a bidirectional optical splitter 1010 to which the optical connector 1005 is connected via a bidirectional optical data line 1042. The optical data line 1042 can be a single bidirectional input/output data line, one or more unidirectional input data lines, one or more unidirectional output data lines, and/or one or more bidirectional input/output data lines.

One bidirectional data terminal of the splitter 1010 is connected via a bidirectional optical data line 1040 to an optical connector 1016 mounted at a face of the wall-mount ONT 1000. The optical data line 1040 can be a single bidirectional input/output data line, one or more unidirectional input data lines, one or more unidirectional output data lines, and/or one or more bidirectional input/output data lines. According to one example embodiment, the optical connector 1016 can be connected to an external ONT (such as a desktop ONT, not shown in FIG. 10) via an optical cable (not shown in FIG. 10) to provide the external ONT with data connectivity to a multi-point network (not shown in FIG. 10), such as a GPON. In this case, one or more user devices (e.g., a computer) can be coupled to the optical data line 1019 by way of the optical connector 1005, the line 1042, the optical splitter 1010, the line 1040, the optical connector 1016, an external optical cable interface (not shown in FIG. 10), and the external ONT (not shown in FIG. 10). In the event that one or more of the devices (e.g., O-E converter 1006, PON controller 1007, switch 1008, Ethernet PHY device 1009, first controller 1012, and/or second controller 1014) of the in-wall ONT 1000 experiences a failure (e.g., a power failure or any other type of failure), the external ONT can be used by the user device in place of the in-wall ONT 1000.

Another bidirectional terminal of the splitter 1010 is connected to an Ethernet data board 1044 via a bidirectional optical data line 1043. The optical data line 1043 can be a single bidirectional input/output data line, one or more unidirectional input data lines, unidirectional output data lines, and/or bidirectional input/output data lines.

The Ethernet data board 1044 includes optical-electrical (O-E) converter 1006 (e.g., a diplexer), Passive Optical Network (PON) controller 1007, a switch 1008 (e.g., an Ethernet media access controller (MAC)/switch), and an Ethernet PHY device 1009.

The O-E converter 1006 converts data from the optical domain received at an optical terminal 1023 to the electrical domain to output a corresponding electrical signal at an electrical terminal 1024, and vice versa. In one example embodiment, the O-E converter 1006 employs frequency domain multiplexing to enable bidirectional (upstream/downstream) optical communication using a single optical data line.

The O-E converter 1006 is connected to a PON controller 1007 via an upstream data line 1025 and a downstream data line 1026. In particular, the electrical input of the O-E converter 1006 is connected to an output of the PON controller 1007 via the upstream data line 1025, and the electrical output of the O-E converter 1007 is connected to an input of the PON controller 1007 via the downstream data line 1026.

The PON controller 1007 performs various functions enabling the ONT 1000 to interface between Ethernet devices and optical networks. The PON controller 1007, for example, performs multiplexing and demultiplexing of data and encoding and decoding of data between formats suitable for optical transmission and suitable for Ethernet devices.

The PON controller 1007 enables one or more external devices (such as, e.g., information appliances which may be Ethernet devices in one example (not shown in FIG. 10)) connected to the ONT 1000 via RJ-45 connector 1004 to share a single PON (e.g., a GPON, not shown in FIG. 10) by controlling the timing and flow of signals between the external devices. For example, although not shown in FIG. 10 for convenience, one or more sets of Ethernet PHY device 1009 and RJ-45 connector 1004, and/or one or more additional connectors and accompanying controllers or the like, can be included in ONT 1000, and can be coupled to switch 1008 to enable one or more external information appliances to be coupled to converter 1006 by way of PON controller 1007, and thus to an external PON by way of wire sheath 1001, optical data input/output line 1019, optical connector 1005, and optical splitter 1010.

The PON controller 1007 also can be connected to one or more LED indicators 1048 via at least one electrical data line 1049, and the one or more LED indicators 1048 also can be connected to the voltage converter 1003 by way of electrical conductor 1021. According to one example, in response to receiving one or more converted voltage signals from the voltage converter 1003, at least one of the one or more LED indicators 1048 is illuminated to indicate the presence of power within the ONT 1000 (e.g., on electrical conductor 1021). In another example, when the PON controller 1007 detects network activity (e.g., the transmission of one or more data signals from and/or to the O-E converter 1006 and/or the Ethernet MAC switch 1008) the PON controller 1007 provides a signal to the one or more LED indicators 1048 via electrical data line 1049 that causes at least one of the one or more LED indicators 1048 to become illuminated; and when the PON controller 1007 detects no network activity (e.g., the lack of transmission of any data signal from and/or to the O-E converter 1006 and/or the Ethernet MAC switch 1008), the PON controller 1007 does not enable illumination of the one or more LED indicators 1048. The one or more LED indicators 1048 are visible through the wall 1020 via a faceplate 1047 of the wall-mount ONT 1000, according to one example embodiment.

The PON controller 1007 also is connected to a switch 1008 (e.g., an Ethernet MAC/switch) via an upstream data line 1027 and a downstream data line 1028. In particular, the electrical input of the PON controller 1007 is connected to an output of the Ethernet MAC/switch 1008 via the upstream data line 1027, and the electrical output of the PON controller 1007 is connected to an input of the Ethernet MAC/switch 1008 via the downstream data line 1028.

The Ethernet MAC/switch 1008 provides addressing and channel access control mechanisms that enable multiple Ethernet devices to access a shared medium (e.g., data lines 1027 and 1028) in a multi-point network, via the wall-mount ONT 1000, in the illustrated example. In one example embodiment, the Ethernet MAC/switch 1008 enables multiple information appliances (e.g., computers, telephones, IP telephones, etc.) to access a GPON (not shown in FIG. 10) via the wall-mount ONT 1000.

The Ethernet MAC/switch 1008 is connected to an Ethernet physical layer transceiver 1009 (sometimes also referred to as a PHY device) via an upstream data line 1029 and a downstream data line 1030. In particular, the electrical input of the Ethernet MAC/switch 1008 is connected to an output of the Ethernet PHY device 1009 via the upstream data line 1029, and the electrical output of the Ethernet MAC/switch 1008 is connected to an input of the Ethernet PHY device 1009 via the downstream data line 1030. The Ethernet PHY device 1009 provides physical signal access to the link and implements the hardware send and receive functions of Ethernet frames.

The Ethernet PHY device 1009 is connected to the RJ-45 connector 1004 via an upstream data line 1031 and a downstream data line 1032. In particular, the electrical input of the Ethernet PHY device 1009 is connected to an output of the RJ-45 connector 1004 via the upstream data line 1031, and the electrical output of the Ethernet PHY device 1009 is connected to an input of the RJ-45 connector 1004 via the downstream data line 1032. One or more external information appliances (not shown in FIG. 10) can be connected to the RJ-45 connector 1004 via an Ethernet cable (not shown in FIG. 10) to provide the one or more information appliances with power and/or data connectivity to a multi-point network (not shown in FIG. 10), such as a GPON.

In the example illustrated in FIG. 10, the Ethernet MAC/switch 1008 is communicatively coupled by way of Ethernet PHY device 1009 to a single Ethernet (RJ-45) connector 1004, although, in other examples the Ethernet MAC/switch 1008 can be communicatively coupled to multiple Ethernet (RJ-45) connectors (by way of the device 1009), one for each of one or more corresponding information appliances (not shown in FIG. 10). In this case, the Ethernet MAC/switch 1008 enables the multiple external information appliances to share the single ONT 1000 by controlling the timing and flow of signals between the information appliances.

In one example embodiment, the ONT 1000 includes one or more first add-on data boards 1045 (e.g., a POTS data board, a wireless data board, a WIFI data board, and/or a ZIGBEE data board) which, in turn, includes a controller 1012 (e.g., a POTS controller, a wireless controller, a WIFI controller, and/or a ZIGBEE controller) that enables the ONT 1000 to provide network connectivity to one or more devices (e.g., an analog telephone, a wireless communication device, a WIFI device, and/or a ZIGBEE device, not shown in FIG. 10). The PON controller 1007 is connected to the controller 1012 via an upstream data line 1033 and a downstream data line 1034. In particular, the electrical input of the PON controller 1007 is connected to an output of the controller 1012 via the upstream data line 1033, and the electrical output of the PON controller 1007 is connected to an input of the controller 1012 via the downstream data line 1034. The controller 1012, in turn, is connected to a connector 1013 (e.g., a POTS RJ-11 connector, a wireless antenna connector, a WIFI connector, and/or a ZIGBEE connector) via electrical lines 1035 and 1036, which may be a ring line 1035 and a tip line 1036, in one example.

The connector 1013 can be connected to one or more information appliances, such as a telephone device, a wireless communication device, a WIFI device, a ZIGBEE device, and/or the like via an interface (not shown in FIG. 10). In one example embodiment, the connector 1013 is connected to at least one external telephone device (not shown in FIG. 10) via a telephone cable (e.g., an RJ-11 cable, not shown in FIG. 10) to provide the one or more telephone devices with power and/or voice connectivity to a telephone network (not shown in FIG. 10), such as a public switched telephone network (PSTN). The connector 1013 is accessible through the wall 1020 via the faceplate 1047 of the wall-mount ONT 1000, in one example embodiment. According to one example embodiment, electrical lines 1035 and 1036 can be coupled to a wireless antenna (not shown in FIG. 10) by way of connector 1013 to enable the ONT 1000 to wirelessly communicate with one or more external wireless devices (not shown in FIG. 10) (such as device 116 of FIG. 1).

The PON controller 1007 performs various additional functions in order to enable the ONT 1000 to interface between POTS devices and optical networks. For example, the PON controller 1007 multiplexes, demultiplexes, encodes, and decodes data between one or more formats suitable for optical transmission and one or more formats suitable for telephone communication.

In one example embodiment, the ONT 1000 includes one or more second add-on data boards 1046 (e.g., an RF video data board, an RFOG data board, and/or the like) which, in turn, includes a controller 1014 (e.g., an RF video controller, an RFOG controller, and/or the like) that enables the ONT 1000 to provide network connectivity to RF video devices (e.g., televisions, not shown in FIG. 10). The PON controller 1007 is connected to the controller 1014 via an upstream data line 1037 and a downstream data line 1038. In particular, the electrical input of the PON controller 1007 is connected to an output of the controller 1014 via the upstream data line 1037, and the electrical output of the PON controller 1007 is connected to an input of the controller 1014 via the downstream data line 1038. Additionally, the controller 1014 is coupled to the bidirectional optical data input/output line 1019 by way of a bidirectional optical data input/output line 1050, the optical splitter 1010, and the optical connector 1005. The controller 1014 is also connected to, and provides one or more RF video signals to, an RF video connector 1015 (e.g., a coaxial connector) via data line 1039.

The RF video connector 1015 can be connected to one or more external video devices (e.g., televisions, not shown in FIG. 10) via an RF cable (e.g., a coaxial cable, not shown in FIG. 10) to provide the one or more video devices with a video signal from a television network (not shown in FIG. 10). The RF video connector 1015 is accessible through the wall 1020 via the faceplate 1047 of the wall-mount ONT 1000, in one example embodiment.

The PON controller 1007 performs various additional functions in order to enable the ONT 1000 to interface between video devices and optical networks. For example, the PON controller 1007 multiplexes, demultiplexes, encodes, and decodes data between one or more formats suitable for optical transmission and one or more formats suitable for video signal communication.

Figure 11A:
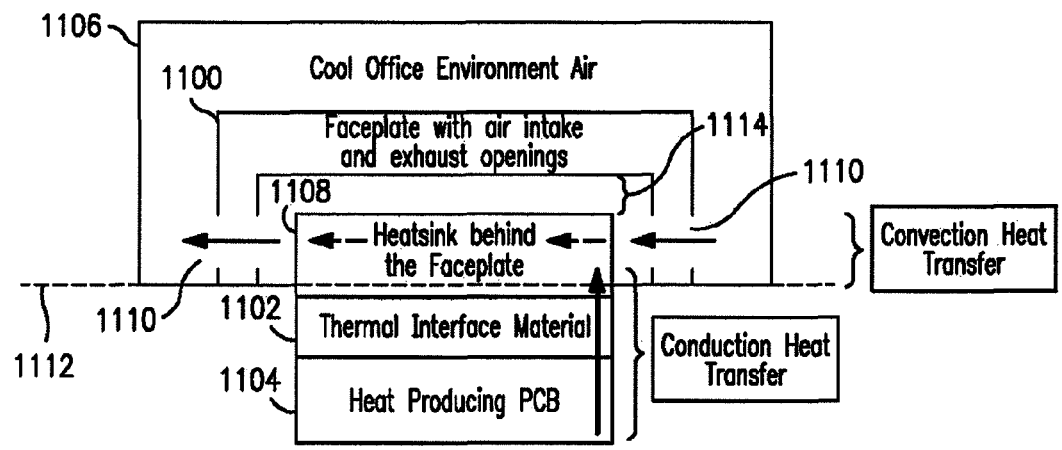
FIG. 11A illustrates a thermal diagram that indicates an exemplary heat transfer scheme in accordance with an example embodiment of the invention.
Figure 11B:
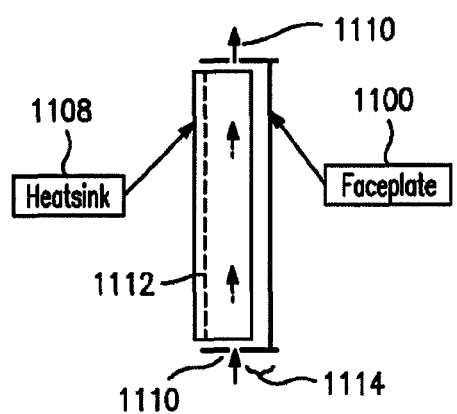
FIG. 11B shows a cross-sectional representation of a heatsink and faceplate of the transfer scheme of FIG. 11A.
Figure 11C:
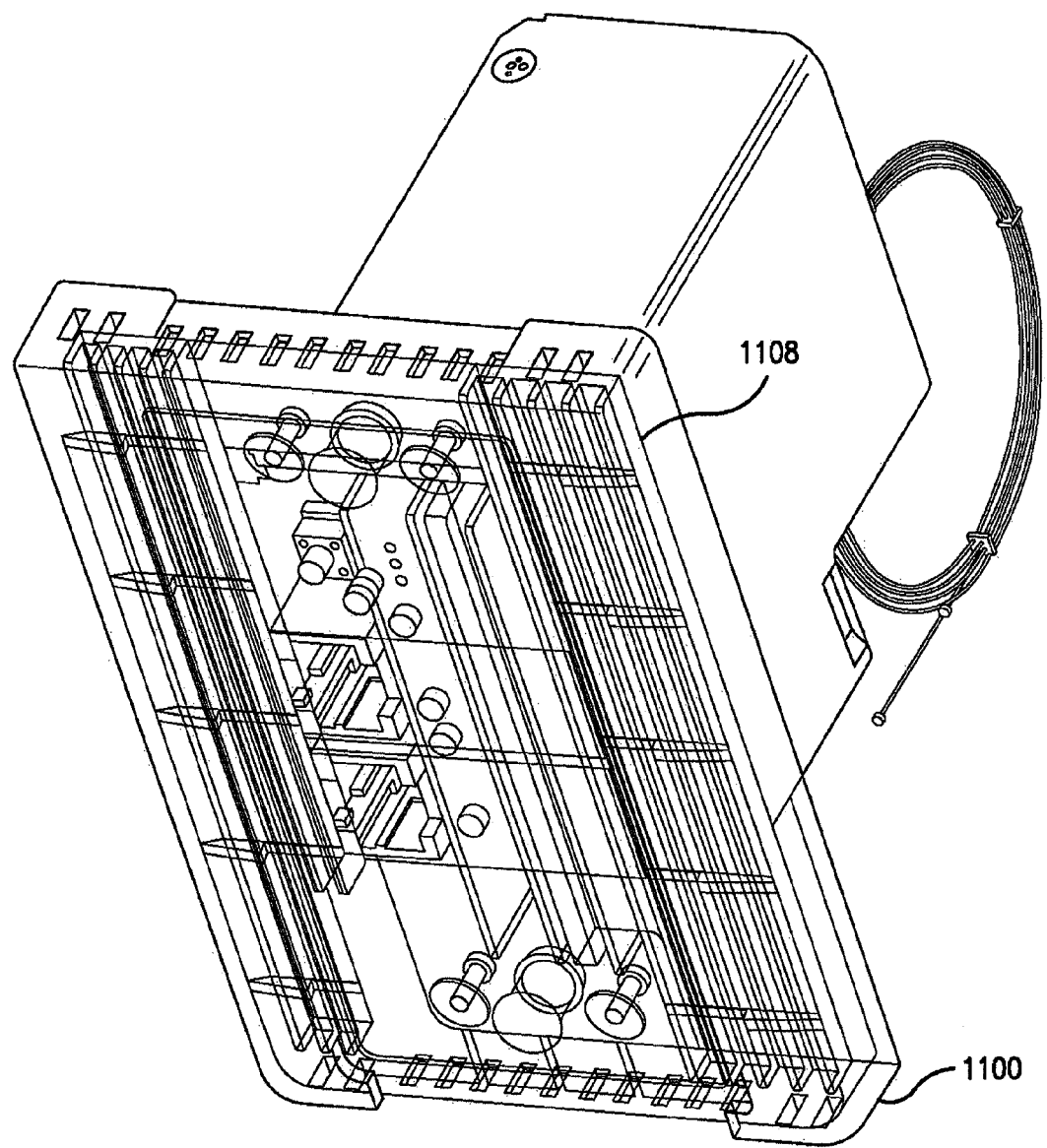
FIG. 11C illustrates a perspective view of an exemplary ONT (as viewed looking towards a front and side thereof) that may be used in accordance with an example embodiment.

Reference is now made to FIGS. 11A and 11B for a thermal diagram that indicates an exemplary heat transfer scheme in accordance with an example embodiment of the invention. The heat transfer scheme described with reference to FIGS. 11A and/or 11B may be employed in the various example ONTs described herein (e.g., ONT 104, 200, 400, 900, and/or 1000) in connection with various example embodiments of the invention. For example, although not necessarily shown in FIG. 1, 2, 3, 4, 5, 9 or 10, various components of ONT 104, ONT 200, ONT 400, ONT 900, and/or ONT 1000 can be constructed of printed circuit board (PCB) that is thermally coupled to ambient air by way of thermal interface material and a heatsink positioned adjacent a faceplate (e.g., faceplate 202, 402, 929, and/or 1047), thus cooling the PCB by providing a path by which heat can be transferred from PCB to the ambient air. That is, each ONT herein can include, in one example, in addition to the faceplate, a heatsink positioned adjacent the faceplate, a thermal interface material, and a PCB, as represented in FIGS. 11A and/or 11B, described below. FIG. 11C illustrates a perspective view of an exemplary ONT (as viewed looking towards a front and side thereof) in which the heat transfer scheme of FIGS. 11A and/or 11B may be employed, in accordance with an example embodiment herein.

Represented in FIG. 11A is a faceplate 1100 (e.g., comprising aluminum and/or another suitable faceplate material), a heatsink 1108 (which, in some example embodiments may be positioned adjacent to or behind the faceplate 1100), a thermal interface material 1102, and a printed circuit board (PCB) 1104 that produces heat. A gap 1114 (e.g., an air gap) can be provided between the heatsink 1108 and the faceplate 1100 to provide some thermal isolation between the heatsink 1108 and the faceplate 1100. The heatsink 1108 can comprise a thermally conductive material, such as, for example, an aluminum alloy, and can also include one or more fins or other protrusions (e.g., as shown in FIG. 11C). The faceplate 1100 can comprise a non-conductive (thermally and/or electrically) material (e.g., plastic) so that it is safe to touch, in one example. The thermal interface material 1102 is provided between the heatsink 1108 and PCB 1104 in the representation. Also represented is a medium 1106 (e.g., ambient air in an office etc.) adjacent to the faceplate 1100, and in thermal communication with (e.g., by being in contact with) the faceplate 1100 and the heatsink 1108 positioned adjacent to the faceplate 1100. As represented in FIG. 11A, heat generated from the PCB 1104 is thermally transferred by conduction through the thermal interface material 1102 to the heatsink 1108, and then is transferred to the medium 1106 by convection heat transfer via one or more openings 1110 in the faceplate 1100. As a result, heat from the PCB 1104 is transferred out of the wall 1112 to the medium 1106 by way of the material 1102 and the heatsink 1108 for cooling.

Referring now to FIG. 11B, represented is a cross-sectional view of an example arrangement of the heatsink 1108 and faceplate 1100 described above in the context of the heat transfer scheme of FIG. 11A, without the PCB 1104, the thermal interface material 1102, and the medium 1106 of FIG. 11A being shown, for convenience. As shown in FIG. 11B, the faceplate 1100 has one or more openings 1110 (at appropriate ends of the faceplate 1100, although the openings are not limited to those positions only) through which ambient environment air can flow through the heatsink 1108 positioned behind the faceplate 1100. In this manner, heat can be forced (e.g., by convection) away from an interior of wall 1112 and towards ambient air where it can be dissipated in the ambient air environment. This can be useful in cases where, for example, the interior of the wall 1112 may serve as a firewall, and where it is thus preferable that heat is transferred out of the wall 1112 and not into the wall 1112.

Figure 12:
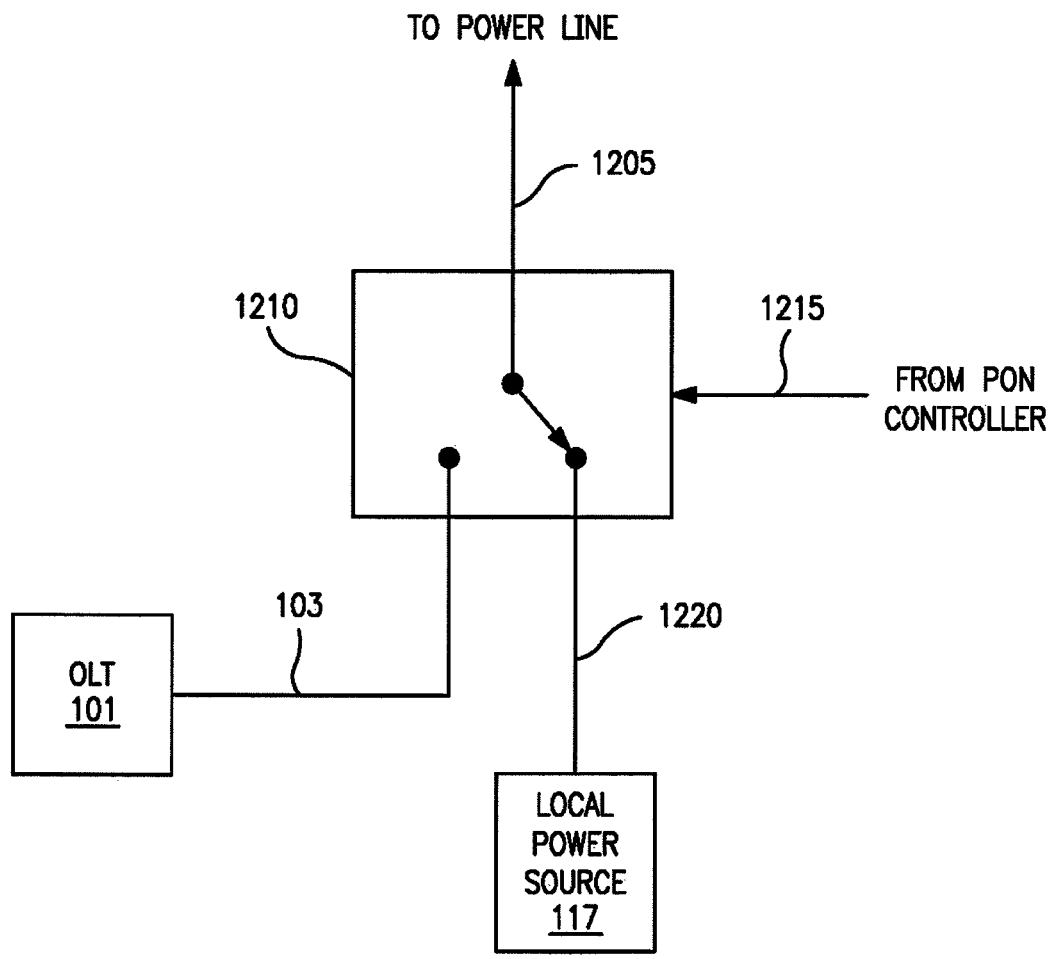
FIG. 12 illustrates an example switching apparatus for switching between two or more power sources configured to provide power to an ONT, in accordance with an example embodiment.

Referring now to FIG. 12, a switch for switching between two or more power sources configured to provide power to an ONT (e.g., ONTs 104, 200, 400, 900, and/or 1000 described above) will now be described. In one example embodiment, the switch 1210 of FIG. 12 can be included in an ONT (e.g., ONTs 104, 200, 400, 900, and/or 1000 described above). In another example embodiment, the switch 1210 can be external to the ONT (e.g., ONTs 104, 200, 400, 900, and/or 1000 described above). As represented in FIG. 12, power output from an OLT 101 can be coupled to switch 1210 via one or more electrical conductor lines 103 via which the OLT 101 can provide the switch 1210 with power. A power output of a local power source 117 (e.g., an in-wall power outlet) also can be coupled to the switch 1210 via one or more electrical conductor lines 1220 via which the local power source 117 can provide the switch 1210 with local power. The switch 1210 also can be coupled via one or more electrical conductor lines 1215 to a control output of a PON controller (e.g., PON controller 907 or 1007 of FIGS. 9 and 10, respectively), from which the switch 1210 can receive one or more control signals for controlling the switch 1210. Although not shown in FIG. 12 for purposes of convenience, the PON controller can include circuitry configured to detect a loss of power, for example at a power signal received from a voltage converter (e.g., the power signal provided by the voltage converter 903 via line 915 (FIG. 9) and/or the power signal provided by the voltage converter 1003 via line 1021 (FIG. 10)). Based on whether power loss has been detected, the PON controller can provide to the switch 1210 via lines 1215 a control signal to control switch 1210. For example, one of the OLT 101 and the local power source 117 can be utilized as a normal power source (in which case the switch 1210 is in a position to select that source) and, when a failure is detected in that source, the PON controller causes the switch 1210 to select the other one of the power sources as a backup, and vice versa.

In some example embodiments, the OLT 101 of FIG. 12 can represent the OLT 101 of FIG. 1, the line 103 of FIG. 12 corresponds to the line 103 of FIG. 1, the power line 1205 of FIG. 12 further represents the power line 911 of FIG. 9 and/or the power line 1018 of FIG. 10, and the PON controller referred to above in the context of FIG. 12 can be the PON controller 907 of FIG. 9 and/or the PON controller 1007 of FIG. 10.

As can be appreciated in view of the foregoing description, despite electrical, mechanical, and thermal challenges, GPON technology may be delivered in a compact and convenient form factor by utilizing wall box/cubical openings and the like to house network terminals, in accordance with example aspects of the invention.

In the foregoing description, example aspects of the invention are described with reference to specific example embodiments. The specification and drawings are accordingly to be regarded in an illustrative rather than in a restrictive sense. It will, however, be evident that various modifications and changes may be made thereto, in a computer program product or software, hardware, or any combination thereof, without departing from the broader spirit and scope of the present invention.

In addition, it should be understood that the figures illustrated in the attachments, which highlight the functionality and advantages of the present invention, are presented for example purposes only. The architecture of the example aspect of the present invention is sufficiently flexible and configurable, such that it may be utilized (and navigated) in ways other than that shown in the accompanying figures.

Although example aspects of this invention have been described in certain specific embodiments, many additional modifications and variations would be apparent to those skilled in the art. It is therefore to be understood that this invention may be practiced otherwise than as specifically described. Thus, the present example embodiments, again, should be considered in all respects as illustrative and not restrictive.

What is claimed:

1. An apparatus, comprising:
a wall-mountable outlet comprising an enclosure, a faceplate mechanically coupled to the enclosure, and a faceplate connector accessible through the faceplate of the wall-mountable outlet; and
an optical network terminal (ONT), provided in the enclosure, including an optical-electrical (O-E) data module, and a power management module arranged to couple power through the faceplate by way of the faceplate connector;
wherein the O-E data module comprises an O-E converter to convert optical data received by the O-E data module from an optical domain to an electrical domain and to convert electrical data received by the O-E data module from an electrical domain to the optical domain, a switch, and a passive optical network (PON) controller interposed between the O-E converter and the switch to perform multiplexing and demultiplexing of data between the O-E converter and the switch, wherein the switch selectively couples data between the PON controller and through the faceplate connector, and
wherein the ONT further comprises an optical connector interposed between the O-E converter and at least one external optical data path,
wherein the ONT further comprises one or more controllers and one or more additional connectors, each of the one or more controllers being interposed between the PON controller and a corresponding one of the one or more additional connectors, and
wherein the one or more controllers comprises at least one of a plain old telephone system (POTS) controller, a wireless controller, a WIFI controller, and a ZIBGEE controller, and wherein the one or more additional connectors comprise at least one of a POTS connector, a wireless connector, a WIFI connector, and a ZIBGEE connector.

2. The apparatus of claim 1, wherein the power management module is arranged to forward conditioned power to at least one of the O-E converter, the PON controller, and the one or more controllers.

3. The apparatus of claim 2, wherein the ONT is configured to be connected to at least one optical communication line in the at least one external optical data path and at least one electrical power line.

4. The apparatus of claim 2, further comprising at least one of a thermal interface material and a heatsink arranged adjacent to the faceplate, and configured to conduct heat.

5. The apparatus of claim 1, wherein the one or more controllers comprises at least one of the plain old telephone system (POTS) controller, the wireless controller, the WIFI controller, the ZIBGEE controller, a radio frequency (RF) video controller and an RF over glass (RFOG) controller.

6. The apparatus of claim 1, wherein the ONT comprises:
a first optical connector arranged to be connected with the at least one external optical data path;
a second optical connector arranged to couple to an information appliance; and
an optical splitter interposed between the first optical connector and the second optical connector.

7. The apparatus of claim 1, further comprising a transceiver interposed between the switch and the faceplate connector.

8. The apparatus of claim 1, wherein the wall-mountable outlet is configured to be mounted in a wall.

9. The apparatus of claim 1, wherein the faceplate connector is configured to couple to an information appliance.

10. The apparatus of claim 1, wherein the wall-mountable outlet comprises a plurality of ports.

11. The apparatus of claim 1, wherein the power management module comprises a voltage converter arranged to convert a voltage provided at an input of the voltage converter and to output a converted voltage.

12. The apparatus of claim 11, wherein the power management module further comprises a noise decoupling circuit having an output coupled to the input of the voltage converter.

13. The apparatus of claim 11, wherein the converted voltage is a source of electrical power for at least one external power destination disposed outside of the apparatus, when the at least one external power destination is electrically coupled to the converted voltage.

14. The apparatus of claim 11, wherein the converted voltage is supplied to the O-E data module.

15. The apparatus of claim 1, further comprising one or more light emitting diodes (LEDs) coupled to at least one of the power management module and the PON controller, and arranged to illuminate for indicating at least one of a presence of power and network activity.

16. The apparatus of claim 1, wherein the wall-mountable outlet is one of single-wide and double-wide.

17. The apparatus of claim 1, wherein the ONT comprises:
a first optical connector arranged to be connected with the at least one external optical data path; and
an optical splitter interposed between the first optical connector and the one or more controllers.

18. A method, comprising:
providing a wall-mountable outlet comprising an enclosure, a faceplate mechanically coupled to the enclosure, and a faceplate connector accessible through the faceplate of the wall-mountable outlet; and
providing an optical network terminal (ONT) in the enclosure, including an optical-electrical (O-E) data module, and a power management module arranged to couple power through the faceplate by way of the faceplate connector;
wherein the O-E data module comprises an O-E converter to convert optical data received by the O-E data module from an optical domain to an electrical domain and to convert electrical data received by the O-E data module from an electrical domain to the optical domain, a switch, and a passive optical network (PON) controller interposed between the O-E converter and the switch to perform multiplexing and demultiplexing of data between the O-E converter and the switch, wherein the switch selectively couples data between the PON controller and through the faceplate connector, and
wherein the ONT further comprises an optical connector interposed between the O-E converter and at least one external optical data path,
wherein the ONT further comprises one or more controllers and one or more additional connectors, each of the one or more controllers being interposed between the PON controller and a corresponding one of the one or more additional connectors, and
wherein the one or more controllers comprises at least one of a plain old telephone system (POTS) controller, a wireless controller, a WIFI controller, and a ZIBGEE controller, and wherein the one or more additional connectors comprise at least one of a POTS connector, a wireless connector, a WIFI connector, and a ZIBGEE connector.

19. The method of claim 18, further comprising providing at least one of a thermal interface material and a heatsink arranged adjacent to the faceplate, and configured to conduct heat.

20. The method of claim 19, further comprising transferring heat away from the wall-mountable outlet by way of the at least one of the thermal interface material and the heatsink.

* * * * *